US006614984B2

(12) United States Patent
Rigatti

(10) Patent No.: US 6,614,984 B2
(45) Date of Patent: Sep. 2, 2003

(54) UNIVERSAL STORAGE DEVICE FOR DATA

(75) Inventor: Mariano Rigatti, Nago-Torbole (IT)

(73) Assignee: Sony Italia S.p.A., Milan (IT)

( * ) Notice: Subject to any disclaimer, the term of this patent is extended or adjusted under 35 U.S.C. 154(b) by 0 days.

(21) Appl. No.: 09/237,875

(22) Filed: Jan. 27, 1999

(65) Prior Publication Data
US 2003/0128965 A1 Jul. 10, 2003

(30) Foreign Application Priority Data

Jan. 30, 1998 (EP) ............................................. 98830046

(51) Int. Cl.⁷ .............................. H04N 5/91; H04N 7/01
(52) U.S. Cl. .......................................... 386/46; 386/131
(58) Field of Search ........................... 386/46, 109, 111, 386/112, 124, 125, 126, 131, 1, 27, 33, 45, 40, 129, 52, 4; 360/32; H04N 5/91, 7/01

(56) References Cited

U.S. PATENT DOCUMENTS 4,525,820 A   7/1985  Enoki et al.
5,335,116 A * 8/1994  Onishi et al.
5,581,529 A  12/1996  Roth et al.

FOREIGN PATENT DOCUMENTS

EP            0 333 006 A     9/1989

* cited by examiner

Primary Examiner—Robert Chevalier
(74) Attorney, Agent, or Firm—Frommer Lawrence & Haug LLP; William S. Frommer; Hans R. Mahr

(57) ABSTRACT

According to the present invention a universal storage device is provided comprising a memory (1), at least one format converter (3, 4), a controller (2) and interface unit (5, 6, 7, 8). The controller (2) thereby controls the communication between the memory (1), the at least one format converter (3, 4) and the interface unit (5, 6, 7, 8). The at least one format converter (3, 4) converts data to be stored in the memory (1) from a predetermined first format to a fixed second format. The fixed second format preferably is a fixed binary code. The at least one format converter (3, 4) furthermore converts data read out from the memory (1) and to be output by the interface unit (5, 6, 7, 8) from said second format (binary code format) to a predetermined third format. The predetermined third format is selected according to the recording medium, on which the data stored in the universal storage device are to be recorded.

10 Claims, 3 Drawing Sheets

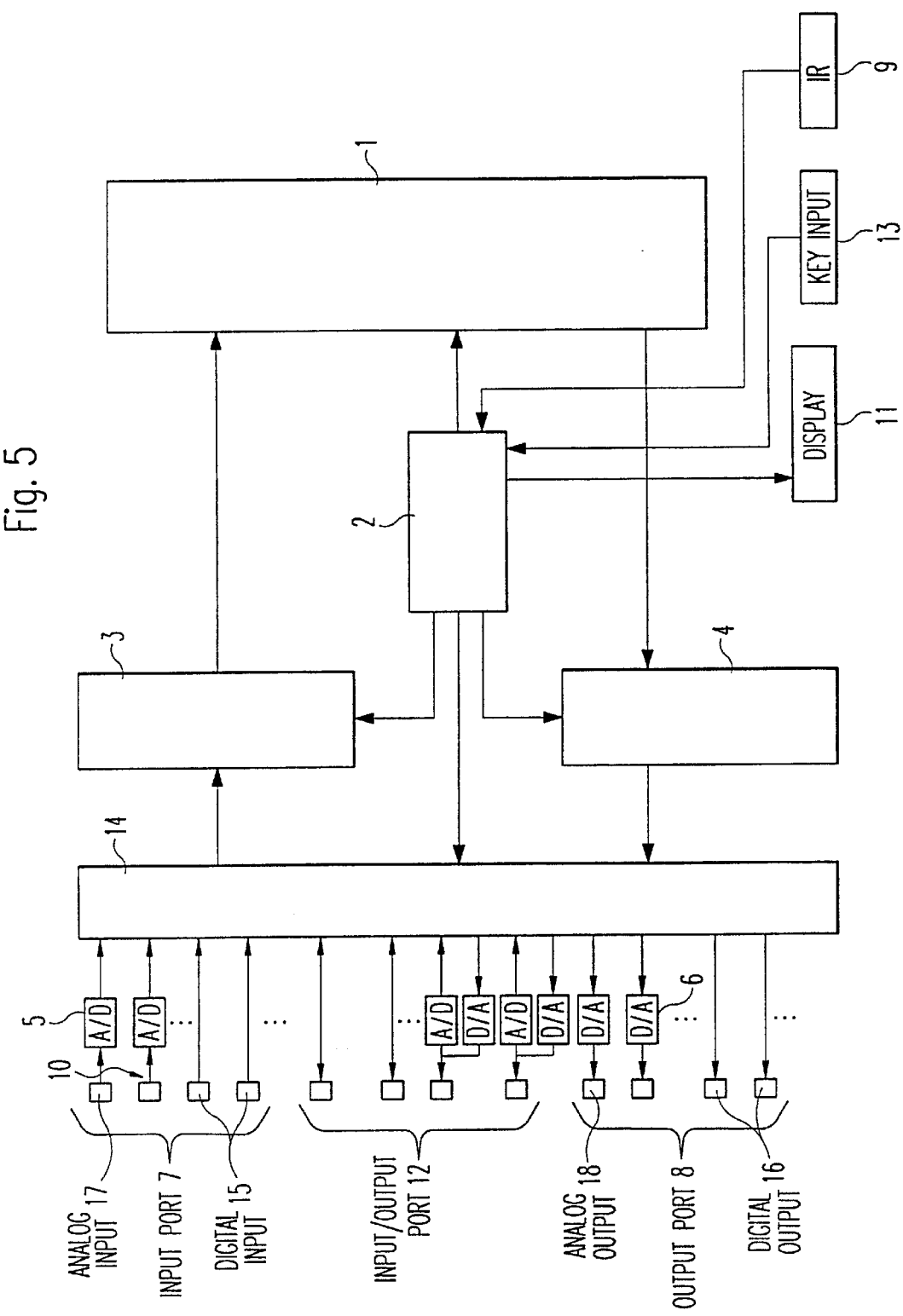

UNIVERSAL STORAGE DEVICE FOR DATA

The present invention relates to an universal storage device capable of storing and format converting data from/to different recording apparatus and recording media.

BACKGROUND OF THE INVENTION

In the state of the art a huge number of different recording apparatus and related recording media is available, for example the audio compact cassette (ACC), the mini disc (MD), different video systems as for example VHS or compact discs (CD). In the future a still increasing number of recording media is to be expected. A dubbing process from one recording medium to another recording medium or to a recording medium of the same type to be effected by the user almost always represents a problem independently from the fact whether dubbing process is to be effected from one recording medium to the same type of recording medium or to another type of recording medium. For example for the dubbing of audio compact cassettes a double tape recording apparatus is necessary increasing the costs and the volume of the apparatus. Furthermore, there is the problem that to effect a dubbing process from a recording medium to another recording medium, usually a format converting apparatus is needed. Obviously, a particularly designed format converter is needed for the dubbing process from one predetermined recording medium to another predetermined recording medium. As a result there is the problem that to effect dubbing processes between different recording media, a huge number of different format converts, if available, is needed.

BRIEF SUMMARY OF THE INVENTION

Therefore, the object of the present invention is to facilitate the dubbing process from one type of recording medium to another type of recording medium or to the same type of recording medium.

Said object is achieved by means of the features of claim 1. The dependent claims develop further the central idea of the invention.

The basic idea of the present invention thereby is to provide an universal digital instant buffer memory.

According to the present invention an universal storage device is provided comprising a memory, at least one format converter, a controller and an interface means. The controller thereby controls the communication between the memory, the at least one format converter and the interface means. The at least one format converter converts data to be stored in the memory from the predetermined first format to a fixed second format, and converts data read out from the memory and to be output by said interface means from fixed said second format to a predetermined third format.

A remote control can be provided for setting the operation conditions of the controller and particularly to preselect the first and/or third format.

A display means can be connected to the controller, which display means is used to provide for a display of the state of the controller and to monitor the data stored in the memory. Optionally a monitor can be connected to the memory.

The interface means can comprise at least one A/D-converter, at least one D/A-converter, an input-port and an output-port comprising respectively a plurality of connectors.

The remote control can set the controller such as to select a certain group of the connectors of the input-port and/or the output-port, respectively.

Alternatively or additionally a dual function input/output-port can be provided which comprises at least one connector connected both with the A/D-converter and the D/A-converter. Said dual function input/output-port such operates as a bidirectional port.

The fixed second format can be a binary code.

Furthermore, a key input operation panel for the controller can be provided.

The present invention will now be explained by means of different embodiments of the present invention and by reference to the accompanying drawings.

BRIEF DESCRIPTION OF THE DRAWINGS

As it can be seen from FIG. 1, at the moment a huge number of different information storage and transmitting devices is known. A still increasing number of recording media is expected in the future. As examples in FIG. 1 there are shown a TV receiver, a personal computer (PC), a compact disc player (CD), a camcorder, a digital video disc reproducing apparatus (DVD), a digital audio tape reproducing/recording apparatus (DAT), a mini disc (MD) player as well as a video tape recorder (video). As shown in FIG. 1 the application of the present invention lies in an easy to be effected dubbing process between the different types of recording medium/apparatus such as to effect a dubbing process from one type of recording medium either to another type of recording medium or to the same type of recording medium.

FIG. 2 shows a typical application of the present invention. According to the state of the art, when dubbing an audio compact cassette (ACC), the two cassettes recording/reproducing apparatus or a single recording/reproducing apparatus containing two cassettes slots are to be used.

According to the present invention, however, information for example from the playback deck can be format converted and stored in the digital instant buffer memory and then be reconverted and recorded out from the digital instant buffer memory to the same deck. Thereby the dubbing of audio cassettes can be effected with a single slot cassette deck. In this case the reconverting process is exactly the inverse operation of the format converting process. With other words, the first (inputting) and the third (outputting) format are identical.

Figure 1:
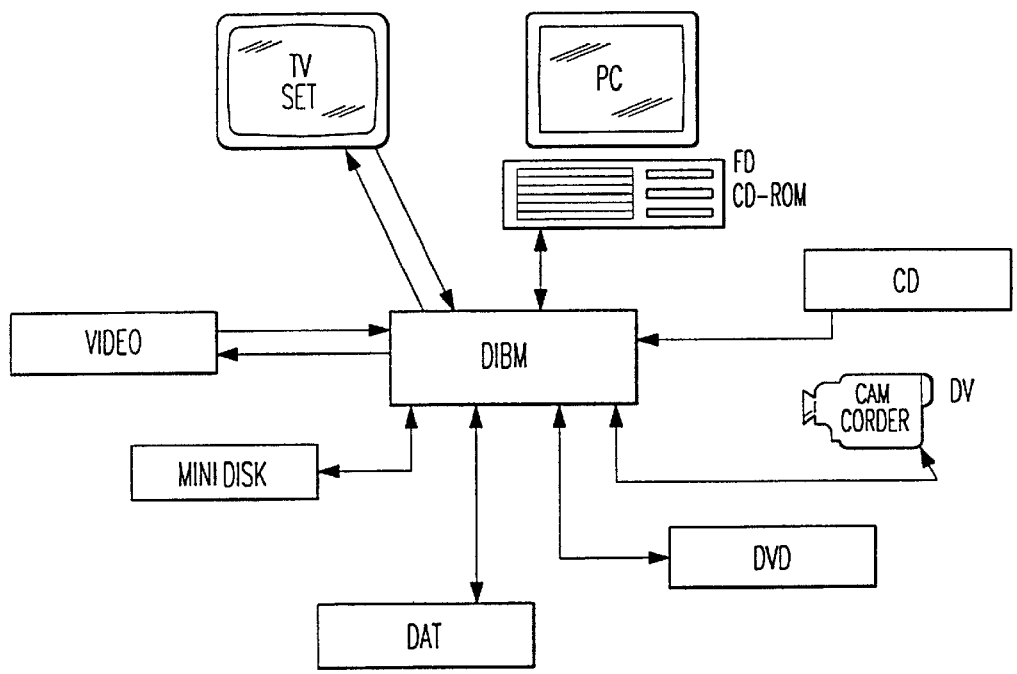
FIG. 1 schematically shows the wide range of application of an universal digital instant buffer memory device according to the present invention.
Figure 2:
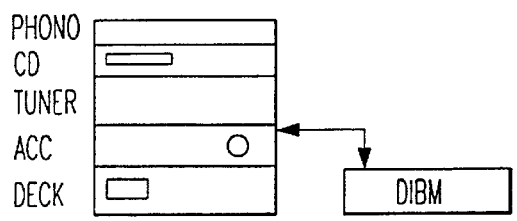
FIG. 2 shows a first application of the present invention.
Figure 3:
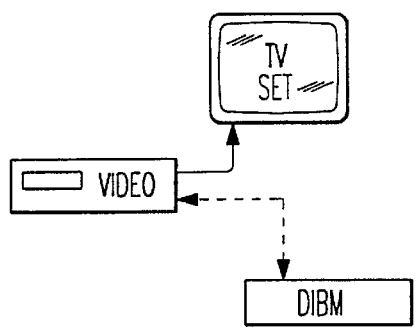
FIG. 3 shows another possible application of the present invention.

FIG. 3 shows a further application of the invention. Thereby, information from a video tape recorder can be stored in the digital instant buffer memory. After the storage the picture information can be re-recorded in the video tape recorder, whereby the information optionally can be format converted for example from a PAL standard to the NTSC standard. Therefore the first (inputting) format does not necessarily correspond to the third (outputting) format. The device according to the present invention therefore can be used for the standard conversion of different video or television standards and formats.

Figure 4A:
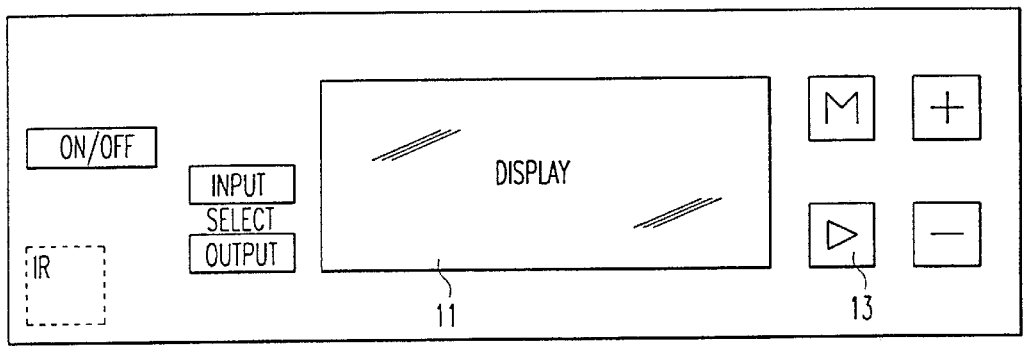
FIG. 4a shows the front side of a device according to the present invention.

FIGS. 4a, b and c show the outer appearance of a device according to the present invention. At first, the front side of an inventive device will be explained with reference to FIG. 4a. Among other well known usual operation keys on the front side operation panel, a key input operation panel 13 is provided for setting the operation state of the device. The operation state of the device set by the key input operation panel 13 is displayed on a display 11. The input operation panel 13 is particularly used to preselect the wanted input/output ports and the corresponding first (input) and third (output) format as will explained later on with reference to FIG. 5.

Figure 4B:
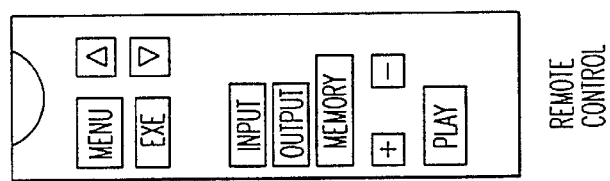
FIG. 4b shows a remote control finding application in the present invention.

Furthermore, a remote control 9 for setting the operation condition of the universal storage device is provided as shown in FIG. 4b. The remote control 9 essentially provides for all features present on the key input operation panel 13 on the front side of the universal storage device according to the present invention.

Figure 4C:
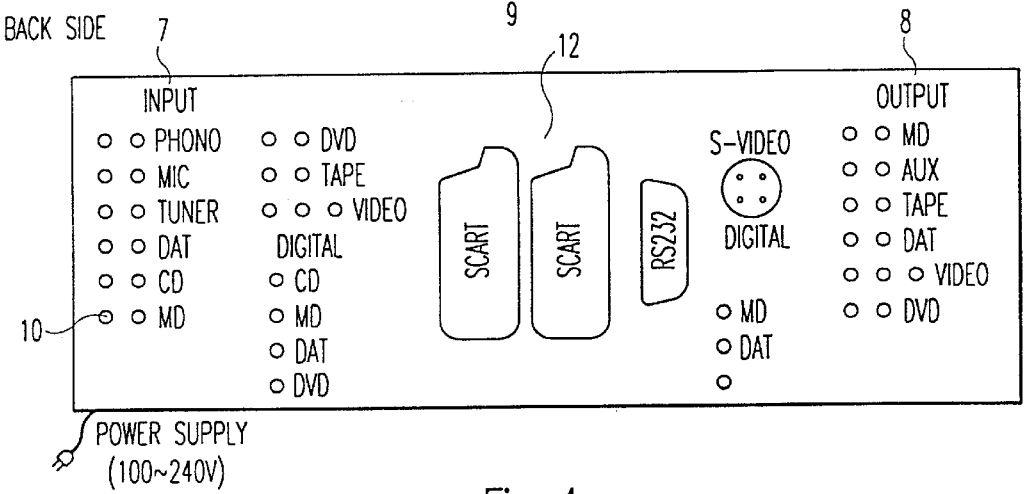
FIG. 4c shows the back side (interface side) of an inventive device, and FIG. 5 schematically shows the internal structure of an inventive device.

FIG. 4c shows the backside of an inventive device. The backside comprises an input port 7, an output port 8 and a bidirectional input/output port 12, which ports respectively comprise a plurality of connectors 10. By means of the different ports 7, 8 and 12 the universal storage device can be connected to all kind of analog or digital information storage or transmitting devices.

The internal structure of an universal storage device according to the present invention will now be explained with reference to FIG. 5. As can be seen from FIG. 5, the universal storage device comprises a memory 1 with a storage capacity which is adapted to the maximum data amount which is expected to the input. The kind of memory used will be selected following the operation requirements (f.e. data amount, access speed, etc.). A controller 2 is provided to control the data transmission between the storage device and the input/output ports 7, 8 and 12, respectively. The operation state of the controller 2 is displayed on the display 11 provided on the front side of the universal storage device. The operation state of the controller 2 can be set either by using the key input 13 provided on the front side of universal storage device or the remote control 9. Data to be stored in this memory 1 can be input either by the input port 7 or the bidirectional input/output port 12. All of the ports comprise connectors 10, which represent either a digital input 15 or an analog input 17. Analog data input by the analog input 17 is supplied to analog/digital converters 5 and then outputs to a switch 14. The switch 14 represents an interface means connecting all connectors 10 of all input or output ports with the elements on the memory side of the device.

Obviously, the analog or digital data input to the switch 14 can be provided for a plurality of data formats. Therefore, a format converter 3 is provided between the switch 14 and the memory 1 for converting the input data to a fixed storage format for the memory 1. With other words, independently of the input format, the format converter 3 converts the input data to a fixed format, for example a binary code format. Under control of the controller 2 thereby the input data from the input port 7 or the input/output port 12 are stored in the binary code format in the memory 1.

When data stored in the memory 1 is to be read out under control by the controller 2 and setting either by the key input panel 13 or the remote control 9, the stored data is given to a second format converter 4 converting for example the fixed binary code format of memory 1 to another format depending on the selected output port. The data converted by the second format converter 4 is passed through the switch 14 controlled by the controller 2 and then output either on the input/output port 12 or the output port 8. Both the output/input port 12 and the output port 8 comprise analog output connectors 18 and digital output connectors 16. In case the data is output on the analog output connector 18, the data from the switch 14 is digital/analog converted by digital/analog converter 6 and then given to the corresponding connectors.

The input/output ports to be used can be selected by an user by means of the operation panel 13 or the remote control 9. The controller 2 then automatically sets the first (input) format for the format converter 3 and the third (output) format of the second format converter 4 depending on the input/output ports selected by the user. Furthermore the controller 2 correspondingly controls the switch 14.

The present invention provides for a simple possibility to store every type of data from one of the available data storage or transmission systems. After the storage the data can be given back to the same data transmission or storage device. Thereby for example high speed dubbing for different recording media, such as a CD, MD, DVD etc. is possible. A video recorder is no longer needed to make a copy of a video tape. The video tape to be copied just has to be play back in the state that the universal storage device according to the present invention is connected to the video recorder, then the video cassette can be changed and the information stored in the universal storage device can be recorded on the same video tape recorder.

Of course, either on the screen 11 on the front side of the device according to the present invention or on a monitor connected to the universal storage device according to the present invention the data which are recorded or reproduced from the universal storage device can be monitored.

What is claimed is:

1. Universal storage device, comprising:
   a memory,
   at least one format converter,
   a controller and
   interface means,
   wherein the controller controls the communication between the memory, the at least one format converter and the interface means, and the at least one format converter converts data to be stored in the memory from a predetermined first format to a fixed second format, and converts data read out from the memory and to be output by said interface means from said second format to a predetermined third format,
   wherein the first format is any of a plurality of compatible formats compatible with the at least one format converter, and the second format is the same for each compatible format used as the first format, such that data stored in the memory in the second format is stored in the same format in memory for each of the plurality of compatible formats compatible with the at least one format converter, and
   wherein data stored in the memory in the second format is stored using the same amount of memory space for data converted from any of the plurality of compatible formats compatible with the at least one format converter.

2. Universal storage device according to claim 1, characterized in that
a remote control is provided for setting the controller.

3. Universal storage device according to claim 2, characterized in that
a display means is connected to the controller provided to display the state of the controller.

4. Universal storage device according to claim 1, characterized in that
the interface means comprise at least one A/D converter, at least one D/A converter, an input port and an output port comprising respectively a plurality of connectors.

5. Universal storage device according to claim 2, characterized in that
the remote control sets the controller such as to select a certain group of connectors of the input port and/or the output port, respectively.

6. Universal storage device according to claim 1, characterized in that
a bidirectional function input/output port is provided, which comprises at least one connector connected both with a A/D converter and a D/A converter.

7. Universal storage device according to claim 1, characterized in that
the fixed second format is binary code.

8. Universal storage device according to claim 1, characterized in that
a key input operation panel for the controller is provided.

9. Universal storage device according to claim 1, characterized in that
the controller sets the first format and the third format of the at least one format converter depending on input/output ports selected by an user.

10. Universal storage device, comprising:
a memory,
at least one format converter,
a controller and
interface means,
wherein the controller controls the communication between the memory, the at least one format converter and the interface means, and the at least one format converter converts data to be stored in the memory from a predetermined first format to a fixed second format, and converts data read out from the memory and to be output by said interface means from said second format to a predetermined third format,
wherein the first format is any of a plurality of compatible formats compatible with the at least one format converter, and the second format is the same for each compatible format used as the first format, and
wherein a bidirectional function input/output port is provided, which comprises at least one connector connected both with a A/D converter and a D/A converter.

* * * * *